Figure 4:
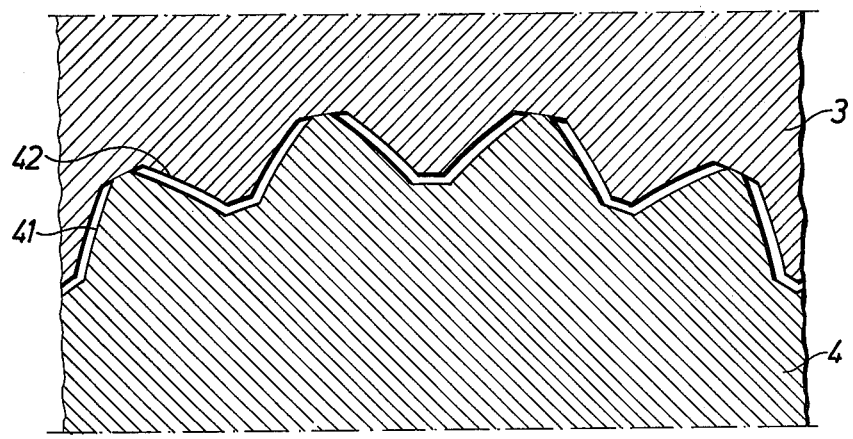

United States Patent [19]

Cedendahl

[11] 4,287,784

[45] Sep. 8, 1981

[54] APPARATUS FOR FACILITATING GEAR CHANGING IN MECHANICAL GEARBOXES

[75] Inventor: Bengt E. Cedendahl, Södertälje, Sweden

[73] Assignee: Saab-Scania Aktiebolag, Södertälje, Sweden

[21] Appl. No.: 53,849

[22] Filed: Jul. 2, 1979

[30] Foreign Application Priority Data

Jul. 10, 1978 [SE] Sweden ............................. 7807669

[51] Int. Cl.³ .................... G05G 9/18; F15B 9/10
[52] U.S. Cl. ................. 74/473 R; 74/388 R; 91/368; 91/391 R
[58] Field of Search ............ 74/335, 388, 473 R, 74/475; 91/377, 391 R; 64/DIG. 2, 9 R; 91/368

[56] References Cited

U.S. PATENT DOCUMENTS

| 2,893,356 | 7/1959 | Murray | 91/391 R |
|---|---|---|---|
| 2,926,539 | 3/1960 | Leonard | 74/335 X |
| 3,053,102 | 9/1962 | Alfieri | 74/335 |
| 3,074,291 | 1/1963 | Alfieri | 74/335 |
| 3,628,403 | 12/1971 | Labat | 74/335 |

FOREIGN PATENT DOCUMENTS

| 1479525 | 3/1967 | France . |
|---|---|---|
| 2061950 | 6/1971 | France . |
| 1025600 | 4/1966 | United Kingdom . |
| 1177375 | 1/1970 | United Kingdom . |
| 1319969 | 6/1973 | United Kingdom . |
| 1336877 | 11/1973 | United Kingdom . |

*Primary Examiner*—Allan D. Herrmann
*Attorney, Agent, or Firm*—Cushman, Darby & Cushman

[57] ABSTRACT

A servo-supported gear changing apparatus for mechanical gearboxes. A rotatably and axially displaceable gear selector shaft in a gear selector housing is axially displaced, during a selecting step, to a preselected engagement position, and is turned to engage or disengage the appropriate gear by at least one gear selector mounted on the shaft. At least one torque-transmitting connection between the shaft and its lever has limited play in both directions, allowing in the initial engagement or disengagement stage a relative movement in the turning direction. A control valve then triggers a pressure-operated servo cylinder to perform the major gear changing work.

12 Claims, 5 Drawing Figures

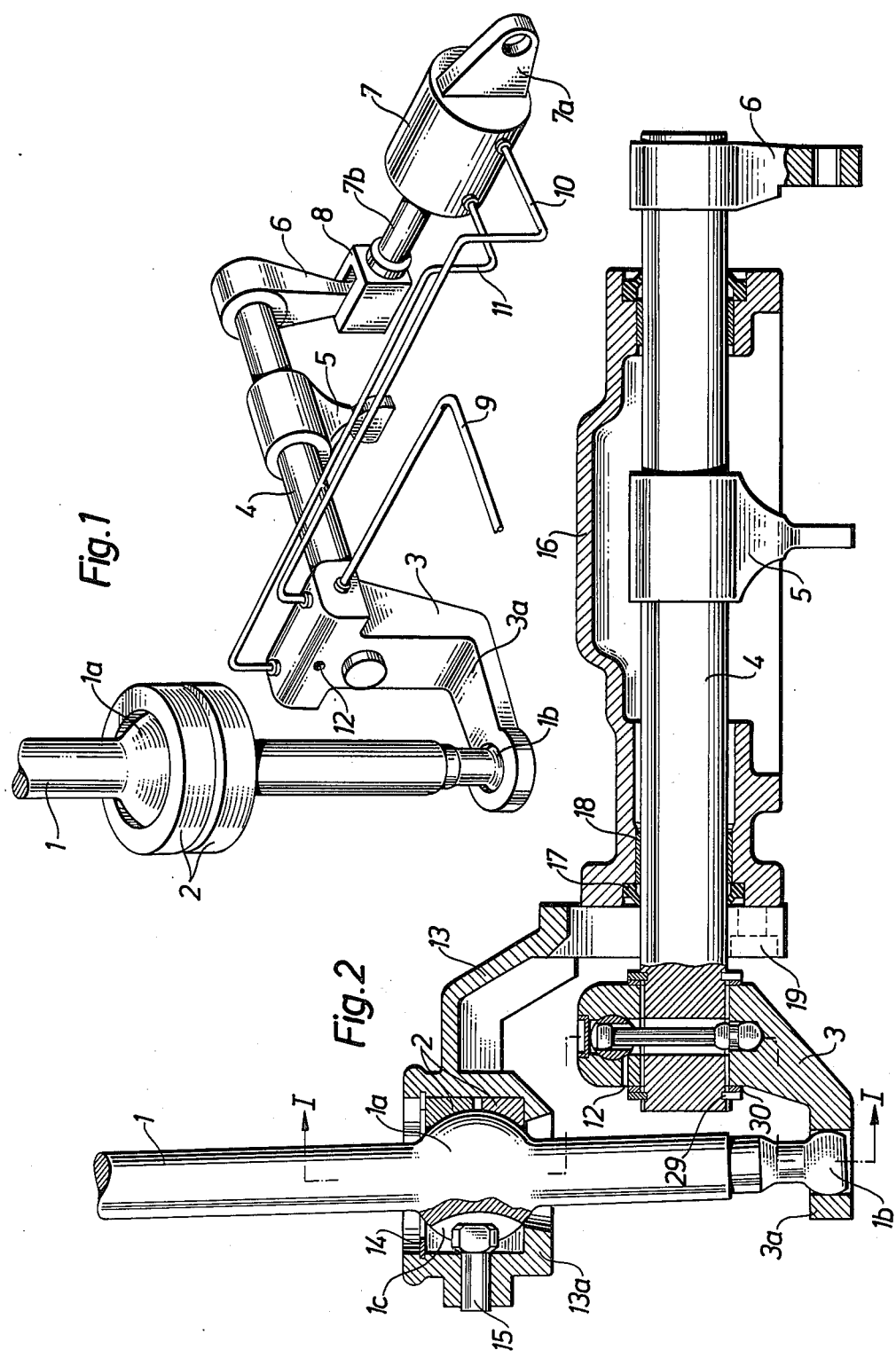

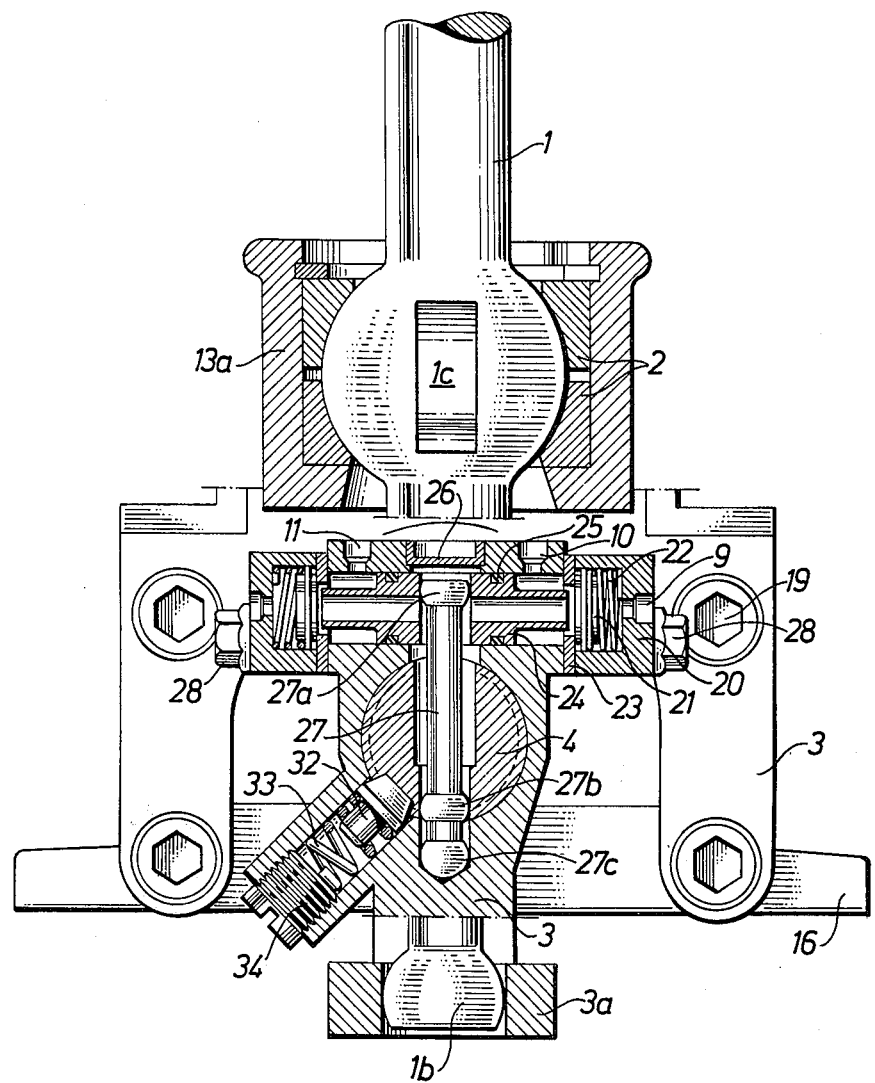

APPARATUS FOR FACILITATING GEAR CHANGING IN MECHANICAL GEARBOXES

The present invention relates to an apparatus for facilitating gear changing in mechanical gearboxes comprising a gear selector housing in which a gear selector shaft is rotatably and axially displaceably mounted, said gear selector shaft being displaced axially during a selecting step to a preselected engagement position and during an engaging or disengaging step is caused to turn for engaging or disengaging the appropriate gear by means of at least one gear selector or the like attached to the gear selector shaft, at least one control valve arranged in the gear changing mechanism being activated during the initial phase of the engaging or disengaging movement and triggering the actuation of a pressurized-medium operated servo cylinder which, with anchorage in a fixed bracket and with connection to a lever or the like on the shaft, is disposed for carrying out gear changing operation to a major extent.

In manually operable gearboxes it is customary to transfer movements from a manual gear change lever to the actual gear change means with the help of a ball joint-mounted gear change rod. In this connection it is also known to equip the gear changing apparatus so that the gear change rod can describe a limited relative free movement during a gear changing step, a control valve in the gear change rod system being activated to trigger the actuation of an operating cylinder which acts to provide an auxiliary force during the continued gear changing operation. Such a gear change rod system implemented by an auxiliary force is based on an axial play in the gear change rod or in its end points. The system is particularly referable to gearboxes in which the gear selection positions are provided by turning a gear selector shaft and engaging the gears by a push or pull action of the same shaft with support by auxiliary force from the operating cylinder.

A prerequisite of known systems is thus the use of a gear change rod between a gear change lever and a gear selector mechanism, which reduces the field of use of the system.

The present invention relates to a gear changing apparatus in which servo-operated auxiliary force means do not demand the use of a movement-transferring gear change rod, but relates instead to a gear changing apparatus which can to advantage also be used in arrangements with the gear change lever directly actuating the gear selector mechanism. The inventive apparatus can thereby be used for both cab-over-engine trucks and cowl-type trucks, i.e. trucks having the engine built forwards, which signifies considerable advantages from the points of view of standardization and service.

The inventive apparatus refers to mechanical gearboxes comprising a gear selector housing in which a gear selector shaft is mounted axially and rotatably displaceable, said gear selector shaft being displaced axially during a selection step to a preselected engagement position and during an engagement or disengagement step is caused to turn for engaging or disengaging the appropriate gear by means of at least one gear selector or the like attached to the gear selector shaft, the invention being primarily distinguished by at least one torque transmitting connection between the gear selector shaft and a lever or the like arranged thereon and being formed with a limited play (clearance) in both directions, said play allowing relative free movement in the turning direction during the initial phase of an engaging or disengaging movement during which a control valve arranged in the gear changing mechanism is activated and in a manner known per se triggers the actuation of a pressure-operated servo cylinder which, with anchorage in a fixed bracket and with connection to a lever or the like on the gear selector shaft, is arranged to execute the gear-changing operation to a major extent.

Figure 5:
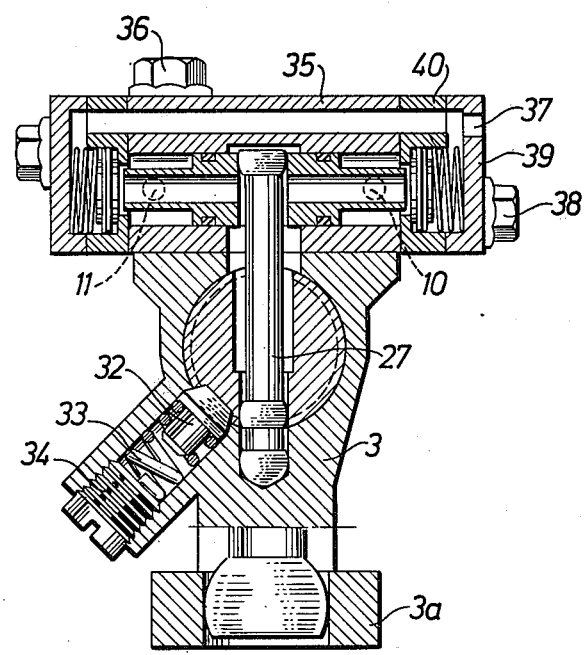

The invention is further distinguished by the control valve for connecting auxiliary force being integrated in or in conjunction with a lever attached to the gear selector shaft with a play which is limited in both turning directions. This results in that the inventive apparatus comprises comparatively simple components which can be easily installed in a vehicle without any great amount of space. Other distinguishing features of the invention are apparent from the accompanying patent claims and the following description, which is made with reference to the accompanying drawings, on which FIG. 1 is a perspective view schematically showing an inventive gear changing apparatus, FIG. 2 is a longitudinal section of a gear selector shaft with selector means which are a part of the gear changing apparatus, FIG. 3 is a section along the line I—I in FIG. 2, FIG. 4 is a cross section of a splines connection on the gear selector shaft, and FIG. 5 is a similar section to the one in FIG. 3 illustrating an alternative embodiment of a control valve.

The gear changing apparatus for a vehicle shown in FIGS. 1 and 2 is manually operable by means of a gear change lever 1. The latter is formed with a spherical portion 1a, by means of which the gear change lever 1 is pivotally mounted between two spherical bearing halves 2, one upper and one lower, mounted in a fixed bearing housing 13a. The bearing housing 13a constitutes a portion of a fixed bracket 13 attached by four screwed connections 19 to a gear selector housing 16, which in turn is fixed to the vehicle gearbox (not shown). The lower bearing half 2 abuts against a bottom of the bearing housing 13a, and a stop washer 14 is clamped into the bearing housing 13a above the upper bearing half 2. The bottom of the bearing housing 13a as well as the stop washer 14 are provided with holes for the passage of the gear change lever 1. The bearing halves 2 are formed with spherical seatings surrounding the ball portion 1a, allowing the gear change lever 1 multidirectional turning movements. For the limitation thereof, a radial groove 1c is made in the spherical portion 1a of the gear change lever 1, a guide pin 15 mounted in the bearing housing 13a from the inside engaging in said radial groove. Such guidance prevents the gear change lever 1 from being turned about its longitudinal axis, and also substantially limits the pivoting movements of the gear change lever 1 to two mutually perpendicular planes.

The lower end of the gear change lever 1 is also formed with a ball portion 1b, adapted for engagement in a bearing orifice in the lower end 3a of a transfer arm or lever 3 attached to a gear selector shaft 4. Said shaft is rotatably and axially displaceably mounted in the gear selector housing 16 with the aid of two bushings 18. For sealing, a seal 17 engaging against the gear selector shaft 4 is mounted in either end of the gear selector housing 16. A gear selector 5, a so-called selector finger, is attached to the gear selector shaft 4 on the inside of the gear selector housing 16, and outside the gear selector housing 16 a servo-actuated lever 6 is also attached to the gear selector shaft 4. The servo-actuated lever 6 is arranged for coaction with a force-amplifying means 7, known per se, for executing mechanical movements. In the exemplified embodiment, the so-called servo means 7 consists of an operating cylinder comprising at least one pressure-transmitting element (not shown) which, under the action of a pressurized medium, acts on the strokes of an out-going shaft 7b. The servo means 7 can be operated either by a hydraulic or a pneumatic pressurized medium. In FIG. 1 there is illustrated a pneumatically operated servo means 7 comprising a double-acting compressed-air cylinder pivotally attached to the cover of the gearbox via a fixed lug 7a at its one end. A fork 8 is attached to the outer end of the shaft 7b projecting out of the cylinder, the outgoing shaft 7b being pivotally attached to the lower end of said servo-actuated lever 6 by means of said fork 8.

The cylinder of the servo means 7 is supplied with pressurized medium by one of two pipes 10,11 under the action of a control valve function arranged in the lever 3. In response thereto the servo means 7 can act on the turning movements of the gear selector shaft 4 in either direction with pulling or pushing stroke movements.

The inventive gear changing apparatus relates to gearboxes in which the gear positions are selected during a first step by means of axial displacement of the gear selector shaft 4 and in which engagement of a gear position takes place in a second step by turning the gear selector shaft 4. The first step, the selection step, is executed by giving the gear change lever 1 a pivoting movement in a plane parallel to the gear selector shaft 4, and the second step, the engaging step, is carried out by giving the lever 1 a pivoting movement in a plane at right angles to the gear selector shaft 4. The selection step requires minor force and can therefore be executed purely manually, whereas the engaging step is more laborious and is preferably executed with auxiliary force support from the servo means 7. During the engaging step, the gear selector 5, or the so-called selector finger, brings the pertinent gear changing members (not shown) into mutual coaction in a manner known per se.

A form of control valve integrated into the lever 3, hereinafter designated transfer arm, is illustrated in FIG. 3. Said control valve is adapted for activation during the engaging step, thereby regulating the engagement and disengagement of the servo means 7. As known in the art, engagement of a gear position from a neutral position can be done by pulling or pushing actuation of the gear lever 1, the gear selector shaft 4 being caused to turn in one direction or the other. With this in mind, it is thus necessary to equip the control valve for such a double function. A vertical hole, formed with shoulders, is therefore bored in the transfer arm 3 and the gear selector shaft 4, for accommodating a valve rod 27. The latter is provided with three spherical shoulders 27a-c, one at either end of the valve rod 27 and one shoulder 27b in an axial position close to the lower end ball 27c. Via the latter end ball, the valve rod 27 bears against the bottom hole made in the transfer arm 3 under the gear selector shaft 4, the intermediate ball 27b assuming a position in the lower part of the through-hole in the gear selector shaft 4. The upper end ball 27a of the valve rod 27 is arranged for engagement in a vertical through-hole in a valve slide 24. Above the end ball 27a, the vertical hole made in the transfer arm 3 is closed off by a plug 26.

The valve slide 24 is displaceably mounted in a horizontal bore passing through the transfer arm 3 above the gear selector shaft 4. On either side of the guide hole for the valve rod 27 the valve slide 24 is provided with a sealing ring 25 engaging against the wall surface of the bore, and outside said sealing the valve slide 24 is formed with a sleeve-shaped extension portion adapted for actuating a valve plate 21 during valve operation. Each valve plate 21 is enclosed in a sleeve-shaped end cover 20, rigidly attached to the transfer arm 3 by two collar screws 28.

The valve plate 21 consists of a plate with radially punched projections, there being a layer of rubber vulcanized to said plate. With support from the inner wall of the cover 20 and the projections on the valve plate 21, the latter is pressed into engagement against a guide plate 23. The latter is clamped between the transfer arm 3 and the end cover 20 and is provided with a free hole for the extension portion of the valve slide 24, whereby the guide plate 23 can be regarded as constituting a valve seat. An inlet hole with a communication pipe 9 to a compressed-air source is made in each end cover 20. The valve slide space is provided with two outlet openings, one on either side of the actual slide 24. Said outlet openings have connection pipes 10,11 with inlet openings in the servo means 7. Said pipes 9,10,11 are schematically depicted in FIG. 1, and in FIGS. 1 and 2 there is also shown an air bleed hole 12 from the space defined between the valve plates 21.

The transfer arm 3 is attached to the gear selector shaft 4 by means of a splines connection, and two circlips, one on either side of the transfer arm 3, for axial fixation. Behind each circlip there is suitably mounted a friction washer 29 which can be formed to coact with a sealing washer 30.

As is apparent from FIG. 4, the splines connection is made with a play, i.e. clearance between the tooth surfaces 41 of the exterior splines on the gear selector shaft 4 and the respective tooth surfaces 42 of the interior splines on the transfer arm 3. In a neutral position for the control valve, illustrated in FIG. 3, the exterior splines on the gear selector shaft 4 assume an intermediate position, illustrated in FIG. 4, in the respective spline grooves on the transfer arm 3. This centering takes place by a detent body 32 displaceably mounted in the arm 3 being pressed down by spring bias into a corresponding depression in the gear selector shaft 4. The detent body 32 is provided with a throat surrounded by a spring 33 which, bearing against a plug 34 screwed into the arm 3, acts on the detent body 32 to provide centering action on the splines connection. The sensitivity of the gear changing apparatus for vibration is also reduced by such a yielding detent function.

During an engaging step, when the transfer arm 3 is actuated by an outside force from the gear change lever 1, the play in the splines connection 41,42 will diminish due to the relative movement occurring between the transfer arm 3 and the gear selector shaft 4. The lower end ball 27c of the valve rod 27 will thus accompany the transfer arm 3 while the intermediate ball 27b assumes an unaltered position in the gear selector shaft 4. This results in that the upper end ball 27a moves in the opposite direction to the lower end ball 27c. As a result of a comparatively large leverage, the upper end ball 27a will move a greater distance than the lower end ball 27c, the upper end ball 27a meanwhile acting on the valve slide 24 so that its extended portion is pressed into engagement against the valve plate 21 to press the latter away from the valve seat in the guide plate 23. Compressed air is thus supplied via the pipe 9 through annular slots between the valve plate 21, the guide plate 23 and the extended portion of the slide 24 and further through an outlet opening and one of the pipes 10 or 11 to the servo means 7.

As soon as the servo means 7 is activated by compressed air supplied, the servo-actuated lever 6 is subjected to the effect of force striving to turn the gear selector shaft 4. This causes the play in the splines connection 41,42 to increase again, and for the upper end ball 27a of the valve rod 27 to return to the initial position, taking the valve slide 24 with it. The valve plate 21 is thereby thus pressed again into engagement against the valve seat on the guide plate 23, thus interrupting the air communication to the servo means 7. The compressed air remaining in the servo means 7 and in the separate chamber of the control valve is thereby evacuated via the bleed hole 12.

To counteract the cessation of auxiliary force from the servo means 7, it is necessary to apply an accommodating, constant force on the gear change lever 1 during an engaging step. If the necessary force for gear changing should be less than the force required to actuate the detent body 32, the gear change takes place without the assistance of the servo means 7. If the necessary gear changing force is larger than the force which can be excercized by the servo means 7, or if the servo means 7 does not function in the intended way for some reason, e.g. loss of compressed-air pressure, changing can be done purely manually while utilizing the splines connection 41,42 between the transfer arm 3 and the gear selector shaft 4.

The gear changing apparatus in accordance with the invention is not restricted to the embodiment illustrated and described but can be modified in alternative embodiments within the scope of the following patent claims. It is thus not necessary to integrate the control valve in the transfer arm 3 but this valve can just as well be formed as a unit connectable to a lever. In FIG. 5 there is shown how a valve housing 35 is connected by a plurality of screws 36 to an upper plane of the transfer arm 3. At the respective ends of the valve housing 35, a valve guide 40 and an end cover 39 are attached by collar screws 38. An inlet hole 37 for pressurized medium is made in the end cover 39, said medium having communication with the space inside the other end cover 39 via a duct in the valve housing 35. From the spaces between the valve plates 21, separated by the valve slide 24, outlet holes are made in the valve housing 35, said holes communicating in a manner described previously with the servo means 7 via the pipes 10 and 11. The embodiment illustrated in FIG. 5 otherwise also has concrete and functional similarities with the previously described gear changing apparatus.

The invention can also be applied to gear changing apparatus including a gear change rod arranged between the gear change lever 1 and the transfer arm 3, the connection to the transfer arm suitably consisting of a conventional ball and socket joint.

Neither is it necessary within the scope of the inventive concept to arrange the control valve integrated in or connected with the transfer arm 3. The control valve can just as well be arranged in another turning connection between the gear selector shaft 4 and a means connecting thereto, e.g. the gear selector 5, whereat said connection should be formed to allow relative play movement in both turning directions. Under said play movement, the servo means 7 can be actuated for providing auxiliary force during the engaging step of a gear changing operation.

What I claim is:

1. An apparatus for facilitating gear changing in mechanical gearboxes comprising a gear selector housing in which a gear selector shaft is rotatably and axially displaceably mounted, at least one lever being secured to the gear selector shaft by means of a torque transmitting connection, said gear selector shaft being displaced axially during a selecting step to a preselected engagement position and during an engaging or disengaging step is caused to turn for engaging or disengaging the appropriate gear, characterized in that the torque transmitting connection between the gear selector shaft and the lever is formed with a limited play in both directions of rotation, said play allowing relative free movement in the direction of rotation during the initial phase of an engaging or disengaging movement during which a control valve arranged in the gear changing mechanism is activated and triggers the actuation of a pressure-operated servo cylinder which, with anchorage in a fixed bracket and with connection to a lever on the gear selector shaft, is arranged to execute the gear changing work to a major extent.

2. An apparatus as claimed in claim 1, characterized in that the control valve for engaging and disengaging the servo cylinder is integrated in the lever.

3. An apparatus as claimed in claim 1, characterized in that a valve housing with the valve means included therein for controlling the servo cylinder is connected to a plane on the lever.

4. An apparatus as claimed in claim 2 or 3, characterized in that the gear selector shaft passes through the lever and in that the lever, via a ball joint, is influenced by movements from an operating lever, giving the gear selector shaft axial displacing movements and turning movements, the control valve and ball joint being disposed on opposite sides of the axis of said gear selector.

5. An apparatus as claimed in any one of claims 2 or 3, characterized in that the torque connection between the gear selector shaft and the lever comprises a spline connection in which teeth on the one member are arranged for engaging in tooth profiles on the other member with evenly distributed play.

6. An apparatus as claimed in claim 5, characterized in that the teeth are centered in the tooth profiles by a conical detent body displaceably mounted in the lever, said body under the action of a spring being pressed into engagement in a corresponding depression in the gear selector shaft.

7. An apparatus as claimed in claim 6, characterized in that in a vertical bottom hole in the lever there is pivotally mounted a valve rod passing through a hole in the gear selector shaft and with its upper end engaging in a horizontally mounted valve slide in the control valve.

8. An apparatus as claimed in claim 7, characterized in that the valve rod is formed with at least one spherical shoulder which, for relative turning movements between the lever and the selector shaft, actuates the valve rod to give pivoting lateral movements which are translated by the valve rod into displacing movements of the valve slide in the control valve.

9. An apparatus as claimed in claim 8, characterized in that the valve slide is symmetrically formed, and that on either side of the connection to the valve rod it is arranged to coact with valve means for regulating the supply and venting of compressed air to and from the servo cylinder.

10. In apparatus for facilitating gear changing in a mechanical gearbox of the kind including a gear selector shaft mounted for reciprocal axial movement between gear selector positions and for reciprocal rotational movement to effect a gear change, a transfer arm for effecting axial and rotational movement of the said gear selector shaft and a manually operable gear change lever connected to said transfer arm to effect linear and swinging movement of said transfer arm, the improvement comprising a torque-transmitting connection connected between said arm and said gear selector shaft for transmitting torque from said arm to said shaft so that swinging movement of said arm results in rotation of said shaft, said connection providing for play which permits independent swinging movement in either direction of said arm relative to said shaft; power-operated means operatively connected to said shaft to selectively apply torque to said shaft in either direction; and means responsive to swinging movement of said arm, in a direction to effect a gear change and during said independent movement of said arm relative to said shaft, to actuate said power-operated means in a mode to apply torque to said shaft in said direction.

11. Apparatus as in claim 10 wherein said power-operated means includes a fluid-operated ram and a mechanical linkage connected to said ram and to said gear selector shaft, and wherein said arm-responsive means includes a control valve for controlling the supply of fluid to said ram.

12. Apparatus as in claim 11 wherein said gear change lever is connected to said transfer arm via a ball joint and wherein the control valve and the ball joint are disposed on opposite sides of the axis of the gear selector shaft.

* * * * *